United States Patent
Khmelev et al.

(10) Patent No.: US 11,922,810 B1
(45) Date of Patent: *Mar. 5, 2024

(54) AUTONOMOUS VEHICLE CONVERGENCE AVOIDANCE SYSTEMS AND METHODS

(71) Applicant: United Services Automobile Association (USAA), San Antonio, TX (US)

(72) Inventors: Yevgeniy Viatcheslavovich Khmelev, San Antonio, TX (US); Oscar Guerra, San Antonio, TX (US); Jeffrey Neal Pollack, San Antonio, TX (US); Janelle Denice Dziuk, Falls City, TX (US); Ashley Raine Philbrick, San Antonio, TX (US); Ryan Thomas Russell, San Antonio, TX (US); David Patrick Dixon, Boerne, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/750,897

(22) Filed: May 23, 2022

Related U.S. Application Data

(63) Continuation of application No. 16/778,911, filed on Jan. 31, 2020, now Pat. No. 11,355,011.

(60) Provisional application No. 62/799,446, filed on Jan. 31, 2019.

(51) Int. Cl.
*G08G 1/0967* (2006.01)
*B60W 60/00* (2020.01)
*G05D 1/00* (2006.01)
*G05D 1/02* (2020.01)
*G07B 15/02* (2011.01)
*G08G 1/01* (2006.01)
(Continued)

(52) U.S. Cl.
CPC ... *G08G 1/096725* (2013.01); *B60W 60/0011* (2020.02); *B60W 60/0016* (2020.02); *G05D 1/0214* (2013.01); *G07B 15/02* (2013.01); *G08G 1/0129* (2013.01); *G08G 1/148* (2013.01); *G08G 1/164* (2013.01)

(58) Field of Classification Search
CPC ............ G08G 1/096725; G08G 1/148; G08G 1/0129; G08G 1/164; G05D 1/0214; B60W 60/0011; B60W 60/0016; G07B 15/02
See application file for complete search history.

(56) References Cited

U.S. PATENT DOCUMENTS 11,355,011 B1 * 6/2022 Khmelev ............... G06Q 10/02
2009/0259365 A1 10/2009 Rohlfs et al.
2014/0218532 A1 8/2014 Nerayoff et al.
(Continued)

*Primary Examiner* — Dale W Hilgendorf
(74) *Attorney, Agent, or Firm* — Fletcher Yoder, P.C.

(57) ABSTRACT

A vehicle adjustment system includes one or more processors configured to receive data from one or more sensors coupled to a vehicle that is in a stationary position. The one or more processors are also configured to analyze the data to determine whether an object is within a buffer zone surrounding the vehicle while the vehicle is in the stationary position. In response to determining that the object is within the buffer zone while the vehicle is in the stationary position, the one or more processors are configured to provide control signals to one or more driving components of the vehicle to reposition the vehicle to an alternate position.

20 Claims, 6 Drawing Sheets

(51) Int. Cl.
    *G08G 1/14*    (2006.01)
    *G08G 1/16*    (2006.01)

(56) References Cited

U.S. PATENT DOCUMENTS

| | | | |
|---|---|---|---|
| 2015/0039173 | A1* | 2/2015 | Beaurepaire ......... B60W 30/06 |
| | | | 701/23 |
| 2016/0325432 | A1* | 11/2016 | Tian ..................... B25J 19/023 |
| 2016/0357187 | A1* | 12/2016 | Ansari ................. G06T 19/003 |
| 2017/0162047 | A1 | 6/2017 | Garcia Lopez |
| 2017/0277184 | A1* | 9/2017 | Fujimura ........... B60W 10/184 |
| 2017/0329346 | A1* | 11/2017 | Latotzki ................ G08G 1/164 |
| 2018/0032082 | A1* | 2/2018 | Shalev-Shwartz ..... G06N 3/044 |
| 2018/0174460 | A1* | 6/2018 | Jung ..................... B60Q 1/525 |
| 2018/0304887 | A1* | 10/2018 | Nordbruch ............ G08G 1/164 |
| 2019/0213881 | A1* | 7/2019 | Bender ........... G08G 1/096775 |
| 2020/0024090 | A1* | 1/2020 | Mushynski ........ B65G 69/2882 |
| 2020/0086853 | A1 | 3/2020 | Kumar et al. |
| 2020/0139959 | A1* | 5/2020 | Akella ............. B60W 60/0015 |
| 2020/0231141 | A1* | 7/2020 | Edling .................... G08G 1/14 |
| 2020/0242935 | A1* | 7/2020 | Nagata ................ G08G 1/09623 |
| 2020/0294105 | A1* | 9/2020 | Jiang .................... G06Q 20/127 |
| 2020/0307559 | A1 | 10/2020 | Göricke et al. |
| 2021/0365029 | A1* | 11/2021 | Molina Cabrera .. G05D 1/0011 |

* cited by examiner

AUTONOMOUS VEHICLE CONVERGENCE AVOIDANCE SYSTEMS AND METHODS

CROSS-REFERENCE TO RELATED APPLICATIONS

This application is a continuation of U.S. patent application Ser. No. 16/778,911, entitled "AUTONOMOUS VEHICLE CONVERGENCE AVOIDANCE SYSTEMS AND METHODS," filed Jan. 31, 2020, now U.S. Pat. No. 11,355,011, which claims priority to and the benefit of U.S. Provisional Application No. 62/799,446, entitled "AUTONOMOUS VEHICLE CONVERGENCE AVOIDANCE SYSTEMS AND METHODS," filed Jan. 31, 2019, which are hereby incorporated by reference in their entirety for all purposes.

BACKGROUND

The present disclosure relates generally to autonomous vehicle systems and methods.

Some vehicles (e.g., autonomous vehicles) are capable of controlling driving operations of the vehicle, such that a person may not interact with or control the vehicle as the vehicle drives to a destination. In such vehicles, a vehicle control system may control the driving operations of the vehicle based on a set of algorithms.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

SUMMARY

In one embodiment, a vehicle adjustment system includes one or more processors configured to receive data from one or more sensors coupled to a vehicle that is in a stationary position. The one or more processors are configured to analyze the data to determine whether an object is within a buffer zone surrounding the vehicle while the vehicle is in the stationary position. In response to determining that the object is within the buffer zone while the vehicle is in the stationary position, the one or more processors are configured to provide control signals to one or more driving components of the vehicle to reposition the vehicle to an alternate position.

In one embodiment, a method of operating a vehicle adjustment system includes receiving, at one or more processors, data from one or more sensors coupled to a vehicle that is in a stationary position. The method also includes analyzing the data to determine whether an object is within a buffer zone surrounding the vehicle while the vehicle is in the stationary position using the one or more processors. The method further includes providing, using the one or more processors, control signals to one or more driving components of the vehicle to reposition the vehicle to an alternate position in response to determining that the object is within the buffer zone while the vehicle is in the stationary position.

In one embodiment, a method of operating a vehicle adjustment system includes receiving, at one or more processors, data from one or more sensors coupled to a vehicle that is in a stationary position. The method also includes receiving an input indicative of a preference of an occupant of the vehicle at the one or more processors. The method further includes analyzing, using the one or more processors, the data to determine whether an object is within a buffer zone surrounding the vehicle while the vehicle is in the stationary position. The method further includes determining an alternate position for the vehicle that would cause the object to be outside of the buffer zone based on the data and the preference using the one or more processors.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
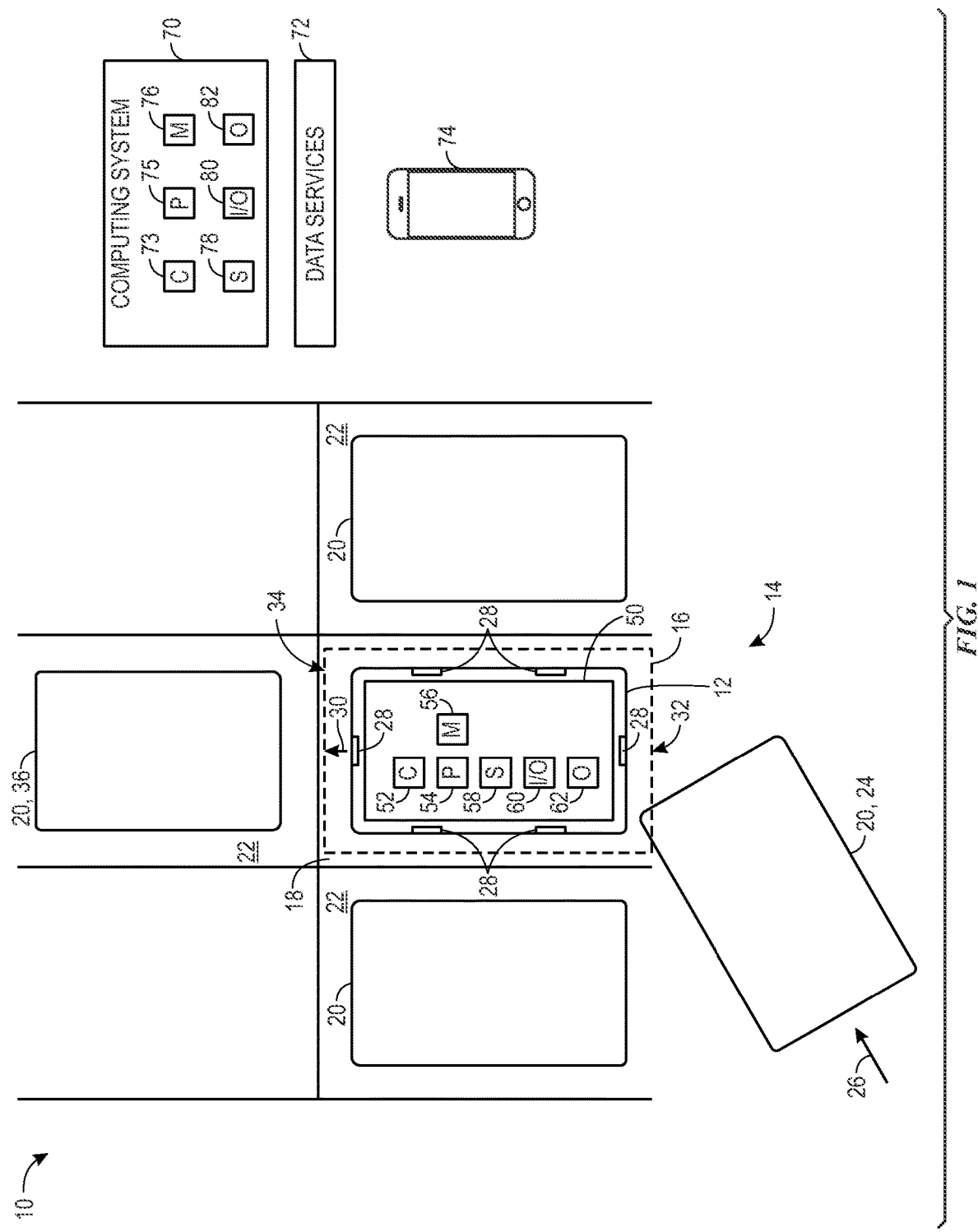
FIG. 1 is a schematic diagram of a parking lot with a vehicle that may be controlled by a vehicle parking system to move from a parked position in response to detection of an object within a buffer zone around the vehicle, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed to autonomous vehicle systems and methods to avoid convergence and eventual collision. More specifically, the present embodiments are generally directed to systems and methods that cause a vehicle (e.g., autonomous vehicle) to automatically move from a parked position (e.g., stationary position, with or without occupants in the vehicle) in response to detection of an object (e.g., another vehicle) within a buffer zone (e.g., virtual buffer zone) around the vehicle. For example, when the vehicle is parked, a vehicle parking system may use sensors and processing components to monitor for objects within the buffer zone. Upon receipt of data (e.g., from one or more sensors mounted on the vehicle) that indicates an object is within the buffer zone, the processing components of the vehicle parking system may determine an alternate position that would place the object outside of the buffer zone or at least further away from the vehicle. The processing components of the vehicle parking system may then provide control signals to driving components of the vehicle to cause the vehicle to move to the alternate position. In some embodiments, the alternate position may be another position within the same parking space. In some embodiments, the alternate position may be another parking space in the same parking lot or in another parking lot. In some embodiments, a vehicle may be essentially stationary (e.g., at a traffic light) and move forward or backward to the alternate position to avoid or mitigate a collision because another vehicle is approaching in an undesirable manner. To facilitate discussion, the examples discussed herein generally include detecting and moving the vehicle in response to another vehicle entering the buffer zone of the vehicle; however, it should be appreciated that the disclosed techniques may be carried out in response to any of a variety of other objects (e.g., shopping carts, strollers, large tree limbs) entering the buffer zone of the vehicle. Furthermore, the disclosed techniques may be employed while the vehicle is not in the parked position (e.g., moving, with or without occupants in the vehicle).

With the foregoing in mind, FIG. 1 is a schematic diagram of a parking lot 10 with a vehicle 12 (e.g., autonomous vehicle) that may be controlled by a vehicle parking system 14 (e.g., vehicle adjustment system, vehicle control system) to move in response to detection of an object (e.g., another vehicle) within a buffer zone 16 (e.g., virtual buffer zone) around the vehicle 12. The buffer zone 16 may have any of a variety of dimensions (e.g., 10, 20, 30, 40, 50, 60, 70, 80, 90, or more centimeters extending laterally outwardly from the vehicle 12). In the illustrated embodiment, the vehicle 12 is positioned within a parking space 18 (e.g., designated by lines) within the parking lot 10. The vehicle 12 may be in a parked position (e.g., stationary position, with or without occupants in the vehicle 12). For example, the engine of the vehicle 12 may be turned off with no occupants in the vehicle 12.

As shown, multiple other vehicles 20 parked in adjacent parking spaces 22 (e.g., designated by lines) are outside of the buffer zone 16. However, while the vehicle 12 is within the parking space 18, one or more other vehicles 20 may leave the parking lot 10, arrive at the parking lot 10, and/or otherwise drive in the vicinity of the vehicle 12. Furthermore, while the vehicle 12 is within the parking space 18, one or more other vehicles 20 may enter the buffer zone 16. For example, in the illustrated embodiment, one of the other vehicles 20, 24 is within the buffer zone 16, such as due to reversing in the direction of arrow 26 to back out of a parking space in another row of the parking lot 10.

In operation, one or more sensors 28 (e.g., proximity sensors, such as optical sensors, ultrasonic sensors, imaging sensors) positioned about the vehicle 12 may detect the other vehicle 20, 24 within the buffer zone 16. As discussed in more detail below, processing components of the vehicle parking system 14 may receive data from the one or more sensors 28 that indicates that the other vehicle 20, 24 is within the buffer zone 16, and the processing components of the vehicle parking system 14 may determine an alternate position (e.g., preferred or appropriate alternate position) for the vehicle 12. The processing components of the vehicle parking system 14 may determine the alternate position based on the one or more inputs from the one or more sensors 28, such as data that indicates a location of the other vehicles 20 relative to the vehicle 12; data that indicates whether any other vehicles 20 in the vicinity of the vehicle 12 are stationary or moving, including a velocity and/or a direction of movement of any other vehicles 20 that are moving; data that indicates a degree by which any of the other vehicles 20 encroach the buffer zone 16, including a location of the encroachment; data that indicates the presence of people near the vehicle 12 (e.g., inside or outside the buffer zone 16); data that indicates open spaces (e.g., gaps between the buffer zone 16 and other vehicles 20) surrounding the vehicle 12, or any combination thereof. As discussed in more detail below, in some embodiments, the processing components of the vehicle parking system 14 may additionally or alternatively determine the alternate position based on one or more inputs indicative of characteristics related to the other vehicles 20 (e.g., make and model, collision avoidance features, collision history).

Then, after determination of the alternate position, the processing components of the vehicle parking system 14 may provide control signals to driving components (e.g., engine, steering system, braking system) of the vehicle 12 to cause the vehicle 12 to move to the alternate position. In some embodiments, the vehicle parking system 14 may limit options to within a single parking space. For example, with reference to FIG. 1, the processing components of the vehicle parking system 14 may determine that the alternate position for the vehicle 12 is toward a front of the parking space 18, and the processing components of the vehicle parking system 14 may then provide control signals to the driving components of the vehicle 12 to cause the vehicle 12 to move in the direction of arrow 30 toward the front of the parking space 18.

Figure 2:
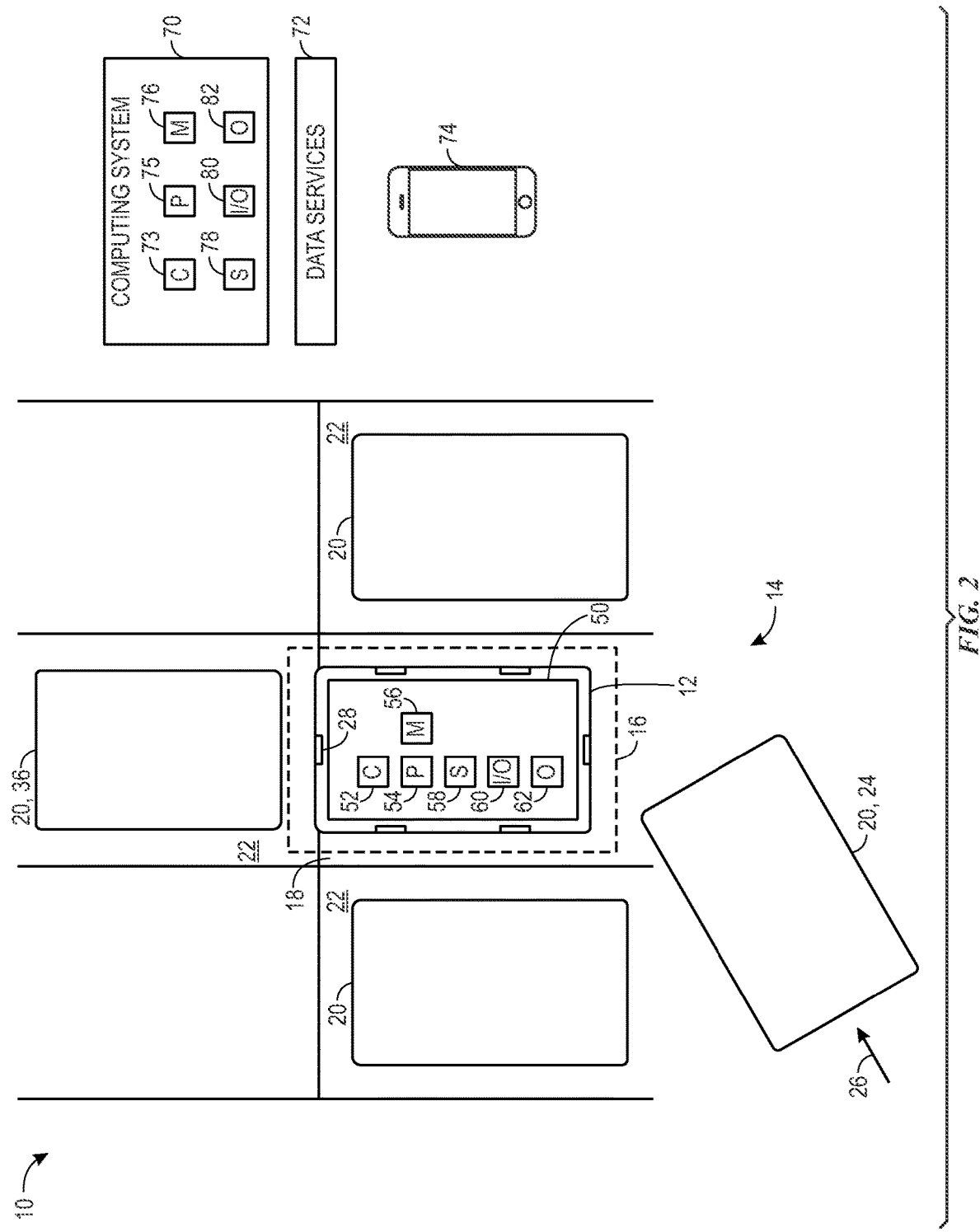
FIG. 2 is a schematic diagram of the parking lot of FIG. 1 with the vehicle repositioned in an alternate position compared to the parked position of FIG. 1, in accordance with an aspect of the present disclosure.

FIG. 2 is a schematic diagram of the parking lot 10 with the vehicle 12 repositioned in this alternate position within the parking space 18. The processing components of the vehicle parking system 14 may determine that this alternate position is appropriate based on one or more of the inputs noted above. For example, the processing components of the vehicle parking system 14 may receive and analyze data that indicates that one of the other vehicles 20, 36 in the adjacent parking space 22 forward of the vehicle 12 is stationary, data that indicates that the other vehicle 20, 24 is moving toward the vehicle in the direction of the arrow 26, data that indicates that the other vehicle 20, 24 encroached a first portion 32 of the buffer zone 16 by a particular degree (e.g., 10 percent), data that indicates that no people are near the vehicle 12, data that indicates a substantial gap between a second portion 34 of the buffer zone 16 and the other vehicle 20, 36. Thus, the processing components of the vehicle parking system 14 may determine that the vehicle 12 should be moved forward into the substantial gap between the second portion 34 of the buffer zone 16 and the stationary other vehicle 20, 36 to reduce the risk of collision with the other vehicle 20, 24 that is moving within the buffer zone 16. In the illustrated embodiment, in the alternate position, the other vehicle 20, 24 may be outside of the buffer zone 16 (or at least further away from the vehicle 12) and/or the other vehicles 20 and any other objects may be outside of the buffer zone 16. However, it should be appreciated that the vehicle 12 may be repositioned in an alternate position in which at least one of the other vehicles 20 (e.g., a stationary vehicle, such as the other vehicle 20, 36) is within the buffer zone 16. It should be noted that the criticality of certain information may be offset by other information. For example, an algorithm for determining vehicular actions (e.g., movement of the vehicle in a particular manner) may provide weighting of variables based on types of data. As a specific example, if an object is identified as moving and within a certain distance of the vehicle 12, the algorithm may indicate that the vehicle 12 should move away from the object. However, if the object is stationary (or moving slower than a threshold) and is the same distance from the vehicle 12, the algorithm may indicate that movement is undesirable because a lower criticality is applied for stationary and/or slow-moving objects.

Indeed, the vehicle parking system 14 may adjust the buffer zone 16 (e.g., adjust the buffer zone 16 or effectively adjust the buffer zone 16 by permitting surrounding vehicles 20 or other objects to enter the buffer zone 16 to some degree). For example, with reference to FIGS. 1 and 2, the first portion 32 of the buffer zone 16 may be expanded and/or the second portion 34 of the buffer zone 16 may be reduced. Such adjustment(s) may enable the vehicle 12 to move further toward the front of the parking space 18 or even partially into another parking space 22 occupied by the stationary other vehicle 20, 36 to keep the moving other vehicle 20, 24 outside of the buffer zone 16 (or at least further away from the vehicle 12). It should be appreciated that if the parking space 22 forward of the vehicle 12 is vacant (e.g., the vehicle 20, 36 is not present), the vehicle 12 may be moved fully into the parking space 22. In this way, the vehicle parking system 14 may block collisions with the vehicle 12.

It should be appreciated that the processing components of the vehicle parking system 14 may cause movement of the vehicle 12 in a similar manner to block collisions with the other vehicles 20. For example, if the other vehicle 20, 36 enters the buffer zone 16 (e.g., instead of the other vehicle 20, 24 entering the buffer zone 16), the processing components of the vehicle parking system 14 may move the vehicle 12 toward the rear of the parking space 18 to an alternate position in which the other vehicle 20, 36 is outside the buffer zone 16 (or at least further away from the vehicle 12). It should also be appreciated that the processing components of the vehicle parking system 14 may only move the vehicle 12 to the alternate position when no people are in the vicinity of the vehicle 14 (e.g., in the path that would be taken to reposition the vehicle 12 to the alternate position) and/or when no other vehicles 20 or objects block the movement of the vehicle 12 to the alternate position, as determined by the processing components based on the one or more inputs from the one or more sensors 28.

To facilitate these techniques, the vehicle parking system 14 may include various processing components, which may be located on the vehicle 12 and/or remote from the vehicle 12. With reference to FIGS. 1 and 2, in some embodiments, the vehicle parking system 14 includes a vehicle control system 50, which may include a communication component 52, a processor 54, a memory 56, a storage 58, input/output (I/O) ports 60, an output device 62 (e.g., a display or a speaker), or any of a variety of other components. The communication component 52 may be a wireless or wired communication component that may facilitate communication between the vehicle control system 50, the one or more sensors 28, and/or other systems located remotely from the vehicle 12, such as a computing system 70, one or more databases or data services 72, and/or a user device 74 (e.g., mobile phone, tablet, personal computer).

The processor 54 may be any suitable type of computer processor or microprocessor capable of executing computer-executable code. The processor 54 may also include multiple processors that may perform the operations described herein. The memory 56 and the storage 58 may represent non-transitory computer-readable media (e.g., any suitable form of memory or storage) that may store the processor-executable code used by the processor 54 to perform various techniques described herein (e.g., process the one or more inputs from the one or more sensors 28, determine the alternate position, provide control signals to the driving components of the vehicle 12). The memory 56 and the storage 58 may also be used to store the data (e.g., data from the one or more sensors 28, parameters of the buffer zone 16), various other software applications, and the like. It should be noted that non-transitory merely indicates that the media is tangible and not a signal.

The I/O ports 60 may be interfaces that may couple to other peripheral components such as the one or more sensors 28, input devices (e.g., keyboard, mouse), input/output (I/O) modules, and the like. The output device 62 may operate to depict indications associated with software or executable code processed by the processor 54. The output device 62 may be any suitable type of display, such as a liquid crystal display (LCD), plasma display, or an organic light emitting diode (OLED) display, for example. In one embodiment, the output device 62 may depict or otherwise provide indications related to the buffer zone 16 (e.g., dimensions), prior movements made by the vehicle 12 via control by the vehicle parking system 14 to avoid collisions, or the like, for visualization by an occupant of the vehicle 12. In one embodiment, the output device 62 may be an input device. For example, the output device 62 may include a touch display capable of receiving inputs from an occupant of the vehicle 12. Thus, the occupant may provide inputs via input devices coupled to the I/O ports 60 and/or via the output device 62, such as inputs related to preferences related to the buffer zone 16 (e.g., reduce or expand the buffer zone 16), preferences related to alternate positions (e.g., to limit movement of the vehicle 12 to only within the parking space 18, to limit movement of the vehicle 12 to only within the parking lot 10, or to permit movement of the vehicle 12 to other parking lots), or the like. The occupant may provide various other preferences such as a preference to determine the alternate position to minimize cost of parking, provide the shortest walk from a current location or any other location input by the occupant, minimize the chance of another vehicle parking next to or near the vehicle 12, or to park in a lighted area or for the alternate position to have other features (e.g., covered, gated, attended, video monitored). Such preferences may be provided via the output device 62, the user device 74, or via another device, and the processor 54 may determine the alternate position based on the preferences in addition to the one or more inputs from the one or more sensors 28. For example, the processor 54 may identify two or more possible alternate positions that would avoid a collision, and the processors 54 may select the alternate position that best satisfies or meets the preferences.

It should be noted that the components described above with regard to the vehicle control system 50 are exemplary components and the vehicle control system 50 may include additional or fewer components as shown. Additionally, it should be noted that the computing system 70 and the user device 74 may also include similar components (e.g., respective communication devices, processors, memories, storage, ports, output devices) to facilitate the disclosed operation of the vehicle parking system 14. For example, the computing system 70 may include a communication component 73, a processor 75, a memory 76, a storage 78, input/output (I/O) ports 80, and/or an output device 82 (e.g., a display or a speaker). The computing system 70 may include multiple processors and/or may be a cloud computing system.

In some embodiments, the vehicle parking system 14 may only include the vehicle control system 50 and/or the vehicle 12 may otherwise be controlled to avoid collisions without communicating with or interacting with any systems located remotely from the vehicle 12. For example, the processor 54 may receive data from the one or more sensors 28, determine the alternate position, and provide the control signals to the driving components of the vehicle 12 (e.g., to turn on the engine or shift to neutral, steer, brake) to cause the vehicle 12 to move to the alternate position. In some embodiments, the vehicle control system 50 may communicate with the user device 74, such as to provide push notifications or to otherwise communicate to the user (e.g., occupant) that the vehicle 12 moved to the alternate position, the location of the alternate position, and the like. As noted above, the vehicle control system 50 may receive inputs (e.g., inputs related to preferences related to the buffer zone 16 or preferences related to alternate positions) from the user device 74.

The vehicle control system 50 may communicate with the one or more databases or data services 72, which may provide information related to the parking lot 10, other parking lots, and/or the other vehicles 20, for example. Data received from the one or more databases or data services 72 may relate to parking space features and/or parking space inventory (e.g., parking spaces available within the parking lot 10, parking spaces available in other parking lots), which may be detected based on satellite data and/or by sensors positioned about the parking lot 10 and/or other parking lots. Such data may be used to determine the alternate position (e.g., to move to another parking space or another parking lot). Data received from the one or more databases or data services 72 may relate to parking lot fee schedules and payment instructions. Such information may be used to facilitate payments to an owner of the parking lot 10. For example, data (e.g., obtained by the one or more sensors 28) may be used to identify the parking lot 10 and/or the parking space 18 within the parking lot 10 (e.g., via global coordinate systems, imaging). The processor 54 of the vehicle control system 50 or any suitable processing component of the vehicle parking system 14 may receive the data, identify the parking lot 10 and/or the parking space 18, determine the owner of the parking lot 10 and/or the parking space 18, determine the appropriate fee, and initiate payment of the appropriate fee from an account of the occupant of the vehicle 12 or other designated individual (e.g., owner of the vehicle 12) to the owner of the parking lot 10 and/or the parking space 18 (e.g., electronically via the Internet).

In some embodiments, data received from the one or more databases or data services 72 may include data related to characteristics of the other vehicles 20, including a make and model of the other vehicles 20, collision avoidance features of the other vehicles (e.g., back-up cameras, autonomous controls), and/or collision history of the other vehicles 20. Such data may be obtained by scanning a license plate number of each of the other vehicles 20 via one or more sensors 28 on the vehicle 12, and the vehicle control system 50 may then retrieve the relevant data for each of the other vehicles 20 from the one or more databases or data services 72. In some embodiments, certain data may be continually broadcast from each vehicle and/or may be obtained by the one or more sensors 28 (e.g., using template matching or other imaging processing techniques to identify characteristics of the other vehicles 20). Such characteristics may be used to determine the alternate position for the vehicle 12 and/or to adjust the buffer zone 16. For example, the processor 54 may expand the buffer zone 16 proximate to other vehicles 20 that include large or wide swinging doors, vehicles 20 that are devoid of collision avoidance features, and/or vehicles 20 that have a collision history. On the other hand, the processor 54 may reduce the buffer zone 16 proximate to other vehicles 20 that include sliding doors, vehicles that include collision avoidance features, and/or vehicles 20 without a collision history.

It should be appreciated that the one or more databases or data services 72 may include other types of data, such as data related to current or upcoming weather events in the vicinity of the vehicle, the parking lot 10, and/or other parking lots. Information about the weather event may additionally or alternatively be determined based on information obtained locally at the vehicle 12, the parking lot 10, and/or other parking lots (e.g., via rain sensors, wind sensors, cameras). In some embodiments, the weather events may be used to determine the alternate position for the vehicle 12 (e.g., to move the vehicle 12 to one of the other parking lots outside of a zone of inclement weather, to move the vehicle 12 to a covered parking lot or to open a garage door to move the vehicle into a parking garage to avoid contact by hail or rain, to avoid alternate positions that flood) and/or to adjust the buffer zone 16 (e.g., the buffer zone 16 may be increased during rainy condition, icy conditions, foggy conditions, or other inclement weather conditions). The information about the weather event may also be provided to the driver, such as to notify the driver to exit the vehicle 12 at a time prior to the onset of the inclement weather.

In some embodiments, the vehicle parking system 14 may include the computing system 70, which may carry out some or all of the processing steps described herein and/or facilitate communication between the vehicle control system 50, the one or more databases or data services 72, and/or the user device 74. For example, data indicating that the other vehicle 20, 24 is within the buffer zone 16 may be obtained by the one or more sensors 28 and may be provided to the vehicle control system 50. The vehicle control system 50 may communicate the data to the computing system 70, which retrieves information about the other vehicle 24 from the one or more databases or data services 72. The computing system may then provide the information to the vehicle control system 50 and/or instruct the vehicle control system 50 to increase the first portion 32 of the buffer zone 16 (e.g., because the other vehicle 20, 24 does not include collision avoidance features). It should be appreciated that the processing steps described herein may be distributed in any suitable manner between the vehicle control system 50, the computing system 70, the user device 74, and/or any other computing or processing systems. Thus, as used herein, the term "processing components" may refer to one or more processing components of the vehicle control system 50 (e.g., the processor 54), the computing system 70 (e.g., the processor the user device 74, and/or any other computing or processing systems that may be part of the vehicle parking system 14.

With the foregoing in mind, additional details with regard to controlling the vehicle 12 using the vehicle parking system 14 are discussed with reference to FIGS. 3-6. To simplify the drawings, some components (e.g., the computing system 50, the computing system 70, the data services 72, the user device 74) of the vehicle parking system 14 are not shown or are not numbered in FIGS. 3-6; however, it should be appreciated that the vehicle parking system 14 may include any of the features shown in FIGS. 1 and 2.

Figure 3:
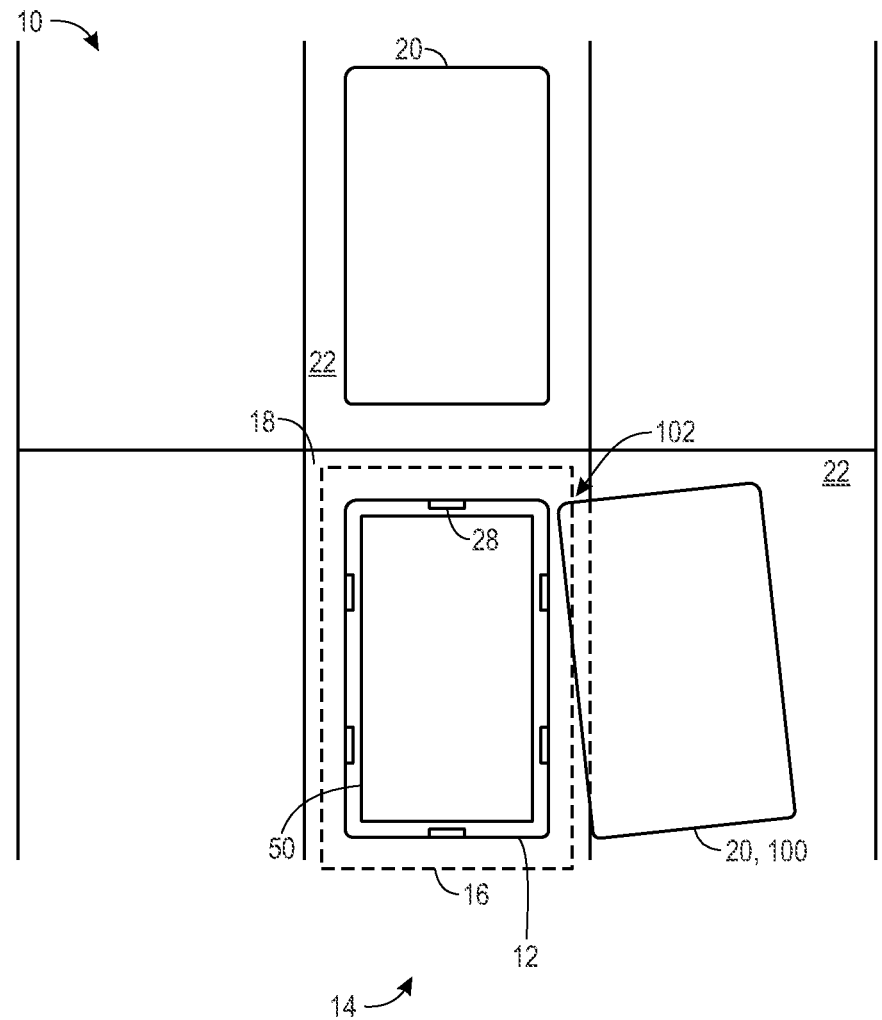
FIG. 3 is a schematic diagram of the parking lot of FIG. 1 with the vehicle in a parked position and another vehicle within the buffer zone of the vehicle, in accordance with an aspect of the present disclosure.

In particular, FIG. 3 is a schematic diagram of the parking lot 10 with one of the other vehicles 20, 100 within the buffer zone 16 of the vehicle 12. While the vehicle 12 is parked within the parking space 18, the other vehicle 20, 100 may park in one of the adjacent parking spaces 22 in a position that overlaps a third portion 102 of the buffer zone 16 of the vehicle 12. The buffer zone 16 (e.g., the third portion 102 of the buffer zone 16 on a lateral side of the vehicle 12) may generally include dimensions that would block collisions between a door of the vehicle 12 and the other vehicle 20, 100 and/or collisions between a door of the other vehicle 20, 100 and the vehicle 12. In some embodiments, the buffer zone 16 may generally include dimensions that facilitate access to the vehicle 12 and/or the other vehicle 20, 100 (e.g., enable the occupant to enter and exit the vehicle 12). As noted above, the buffer zone 16 may be adjusted, which may enable the occupant to set (e.g., increase) the buffer zone 16 based on the size of the occupant and/or to facilitate entry and exit while carrying bags, boxes, an infant carrier car seat, for example. In some cases, the occupant may choose to set (e.g., decrease) the buffer zone 16, such as to reduce the chances that the vehicle 12 will be repositioned to an alternate position while parked. The occupant may set or adjust the buffer zone 16 via the output device 82 and/or the user device 74, for example.

Figure 4:
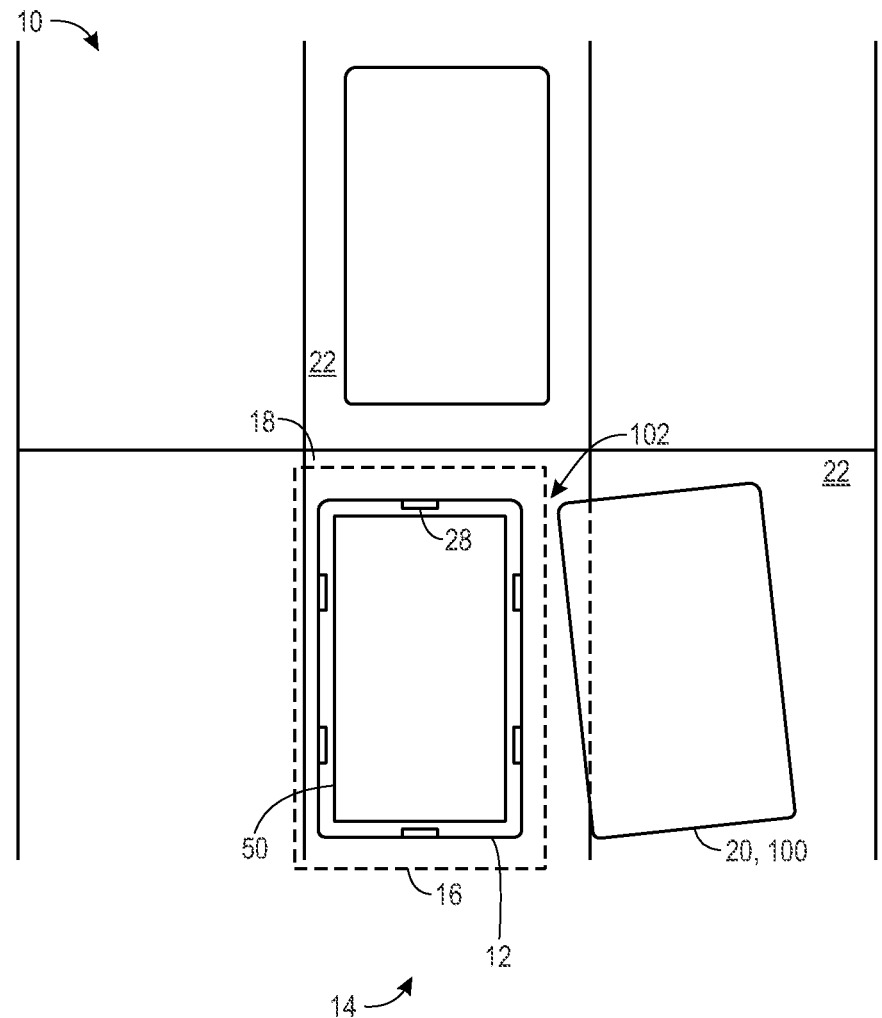
FIG. 4 is a schematic diagram of the parking lot of FIG. 1 with the vehicle repositioned in an alternate position compared to the parked position of FIG. 3, in accordance with an aspect of the present disclosure.

The one or more sensors 28 may detect the encroachment of the buffer zone 16. The processing components of the vehicle parking system 14 may receive data indicative of the encroachment of the buffer zone 16 from the one or more sensors 28, determine the alternate position, and then cause movement of the vehicle 12 to the alternate position. For example, FIG. 4 is a schematic diagram of the parking lot 10 with the vehicle 12 repositioned to this alternate position within the parking space 18. To achieve the alternate position shown in FIG. 4, the processing components of the vehicle parking system 14 may turn on the engine of the vehicle 12, back the vehicle 12 out of the parking space 18, and pull the vehicle 12 back into the parking space 18. In the alternate position, the other vehicle 20, 100 may be outside of the buffer zone 16 (or at least further away from the vehicle 12) and/or the other vehicles 20 and any other objects may be outside of the buffer zone 16. However, it should be appreciated that the vehicle 12 may be repositioned to an alternate position in which at least one of the vehicles (e.g., a stationary vehicle) and/or other object is within the buffer zone 16.

With reference to FIGS. 3 and 4, the processing components of the vehicle parking system 14 may only move the vehicle 12 to the alternate position after the occupants of the other vehicle 20, 100 exit the other vehicle 20, 100, when no people are in the vicinity of the vehicle 12, and/or when no other vehicles 20 or objects block the movement of the vehicle 12 to the alternate position. The one or more inputs from the one or more sensors 28 may indicate that the path to the alternate position is clear and that it is appropriate to move the vehicle 12 to the alternate position.

Even though the buffer zone 16 may generally be sized to avoid collisions between the door of the other vehicle 20, 100 when a body of the other vehicle 20, 100 is outside of the buffer zone 16, the processing components of the vehicle parking system 14 may move the vehicle 12 in response to the door entering the buffer zone 16. Similarly, the processing components of the vehicle parking system 14 may move the vehicle 12 in response to contact between the occupant of the other vehicle 20, 100 (or an object carried by the occupant of the other vehicle 20, 100, such as an infant carrier car seat) and the vehicle 12 when the occupant of the other vehicle 20, 100 exits the other vehicle 20, 100. In this way, the vehicle parking system 14 reduces the potential for contact between the occupant of the other vehicle 20, 100 (or the object carried by the occupant of the other vehicle 20, 100) and the vehicle 12 when the occupant of the other vehicle 20, 100 returns to the other vehicle 20, 100 and/or facilitates access to the vehicle 12.

Figure 5:
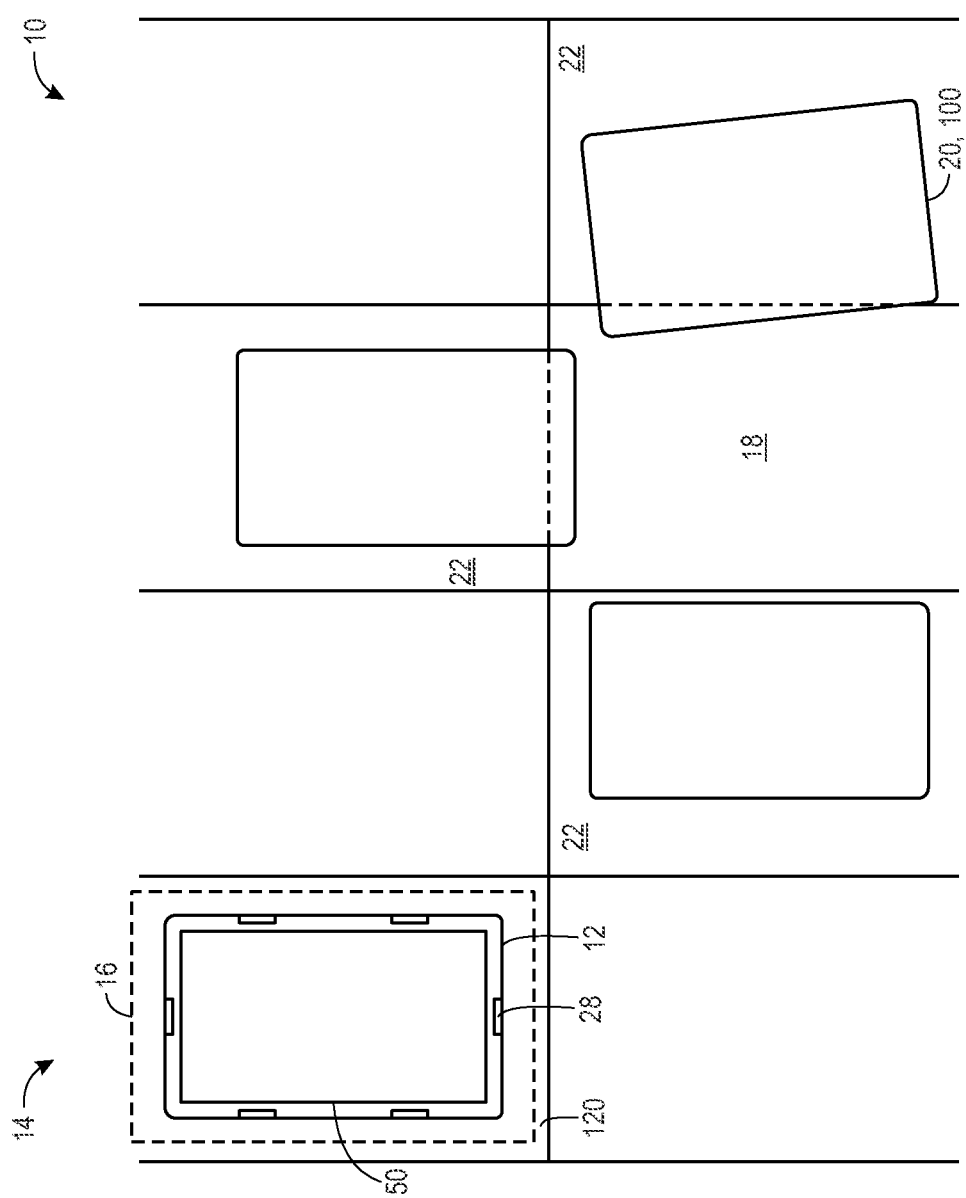
FIG. 5 is a schematic diagram of the parking lot of FIG. 1 with the vehicle repositioned in an alternate position in another parking space, in accordance with an aspect of the present disclosure.

As discussed above, the vehicle parking system 14 may determine that the alternate position for the vehicle 12 is another parking space. Accordingly, FIG. 5 is a schematic diagram of the parking lot 10 with the vehicle 12 repositioned in another parking space 120 to place the other vehicles 20 outside of the buffer zone 16 of the vehicle 12. As shown, the parking space 18 that was previously occupied by the vehicle 12 may be surrounded by other vehicles 20 in a manner that makes it challenging or even impossible to reposition the vehicle 12 within the parking space 18 to place all of the other vehicles 20 outside of the buffer zone 16. In such cases, the vehicle parking system 14 may access information about available parking spaces (e.g., from the one or more sensors 28 and/or from the one or more databases or data services 72). In some embodiments, the one or more sensors 28 may detect available parking spaces in the vicinity of the vehicle 12. In some embodiments, the one or more databases or data services 72 may provide data related to available parking spaces in the parking lot 10 and/or in other parking lots. For example, sensors in the parking lot 10 and/or in the other parking lots may monitor available parking spaces and update the one or more databases or data services 72. Subsequently, the processing components of the vehicle parking system 14 may provide the control signals to the driving components of the vehicle 12 to move the vehicle 12 to one of the available parking spaces, such as the parking space 120. The parking space 120 may be selected based on its proximity to the parking space 18, proximity of other vehicles 20 to the parking spaces 18, 120, characteristics of the other vehicles 20 in any parking spaces 22, 134 adjacent to the parking spaces 18, 120 (e.g., preference for the parking space 120 with no other vehicles 20 in adjacent parking spaces 22), and/or any of the other factors disclosed herein.

Figure 6:
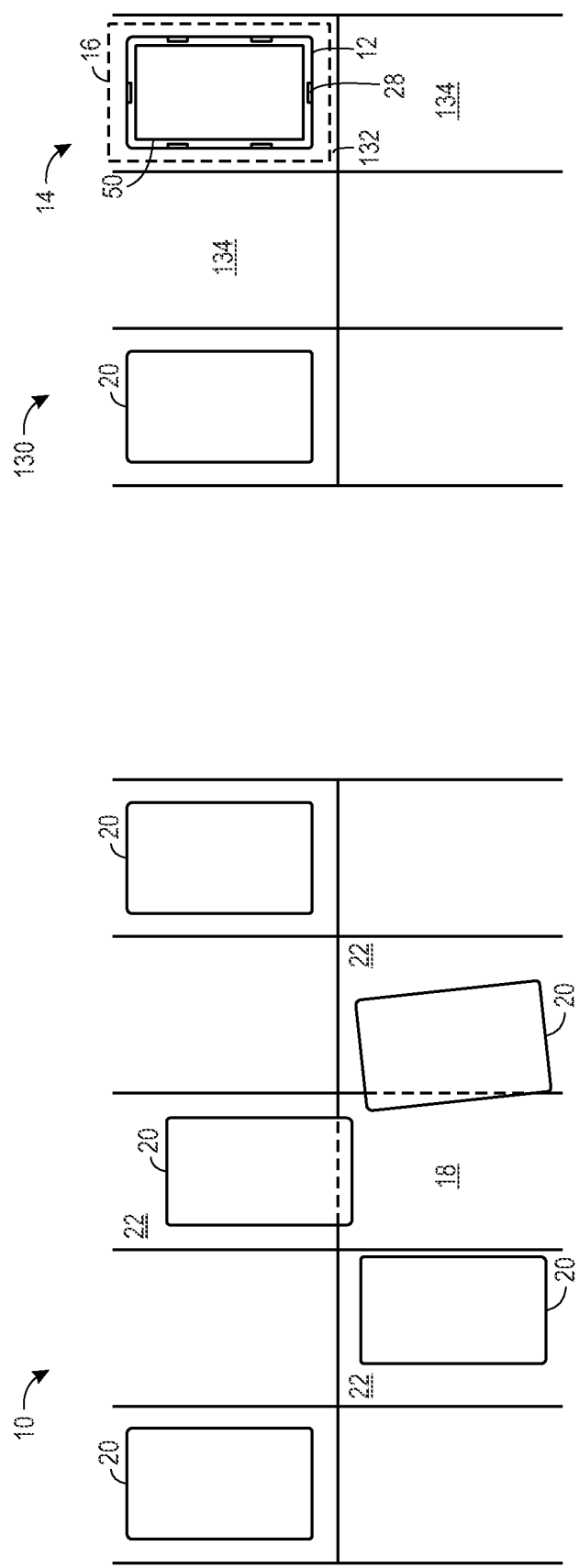
FIG. 6 is a schematic diagram of the parking lot of FIG. 1 with the vehicle repositioned in an alternate position in another parking lot, in accordance with an aspect of the present disclosure.

FIG. 6 is a schematic diagram of the parking lot 10 with the vehicle 12 repositioned in another parking lot 130 to place the other vehicles 20 outside of the buffer zone 16 of the vehicle 12. As shown, the parking space 18 that was previously occupied by the vehicle 12 may be surrounded by other vehicles 20 in a manner that makes it challenging or even impossible to reposition the vehicle 12 within the parking space 18 to place all of the other vehicles 20 outside of the buffer zone 16. In such cases, the vehicle parking system 14 may access information about available parking spaces in the manner discussed above. The parking lot 10 may not include any available parking spaces, may not include any parking spaces large enough to accommodate the buffer zone 16 of the vehicle 12, and/or may not include any parking spaces with open adjacent parking spaces. However, the other parking lot 130 may include one or more suitable or better parking spaces, such as a parking space 132 that can accommodate the buffer zone 16 of the vehicle 12 and/or that is surrounded by one or more open adjacent parking spaces 134. Accordingly, the vehicle parking system 14 may cause movement of the vehicle 12 from the parking space 18 in the parking lot 10 to the parking space 132 in the parking lot 130.

The vehicle parking system 14 may account for any preferences entered by the occupant (e.g., preferences related to moving the vehicle 12) and/or may send a notification to the occupant via the user device 74, as discussed above. The vehicle parking system 14 may identify the parking lot 130 and/or the parking space 132, determine the owner of the parking lot 130 and/or the parking space 132, determine the appropriate fee, and initiate payment of the appropriate fee from an account of the occupant of the vehicle 12 or other designated individual (e.g., owner of the vehicle 12) to the owner of the parking lot 130 and/or the parking space 132 (e.g., electronically via the Internet). The examples discussed herein generally include detecting and moving the vehicle 12 in response to another vehicle 20 entering the buffer zone 16 of the vehicle 20; however, it should be appreciated that the disclosed techniques may be carried out in response to any of a variety of other objects (e.g., shopping carts, strollers, large tree limbs) entering the buffer zone 16 of the vehicle 12. In some such cases, the processing components may determine characteristics of the object (e.g., type of object, any movement of the object, size of the object) based on the one or more inputs from the one or more sensors 28 (e.g., template matching or other imaging techniques), and the processing component may then determine the alternate position and whether to instruct movement of the vehicle 12 to the alternate position based on such characteristics. For example, the processing components may instruct movement of the vehicle 12 to the alternate position upon detection of a shopping cart moving toward the vehicle 12 within the buffer zone 16 of the vehicle 12, but the processing components may maintain the vehicle 12 in the parked position upon detection of a person standing within the buffer zone 16.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A vehicle adjustment system, comprising:
   one or more processors;
   memory storing instructions executable by the one or more processors to cause the one or more processors to:
   analyze data from one or more sensors coupled to a vehicle to identify one or more characteristics of an object in a vicinity of the vehicle;
   adjust a buffer zone surrounding the vehicle based on the one or more characteristics of the object to establish an adjusted buffer zone; and
   provide control signals to one or more driving components of the vehicle to move the vehicle to place the object outside of the adjusted buffer zone.

2. The vehicle adjustment system of claim 1, wherein the object is another vehicle.

3. The vehicle adjustment system of claim 2, wherein the one or more characteristics comprise a make of the another vehicle, a model of the another vehicle, or both.

4. The vehicle adjustment system of claim 2, wherein the one or more characteristics comprise presence of a collision avoidance feature on the another vehicle.

5. The vehicle adjustment system of claim 2, wherein the one or more characteristics comprise a collision history of the another vehicle.

6. The vehicle adjustment system of claim 1, wherein the one or more characteristics comprise a movement of the object, a type of the object, a size of the object, or any combination thereof.

7. The vehicle adjustment system of claim 1, wherein the instructions are executable by the one or more processors to cause the one or more processors to provide the control signals to the one or more driving components of the vehicle to move the vehicle from a stationary position.

8. The vehicle adjustment system of claim 1, wherein the instructions are executable by the one or more processors to cause the one or more processors to provide the control signals to the one or more driving components of the vehicle to move the vehicle without any occupants in the vehicle.

9. The vehicle adjustment system of claim 1, wherein the instructions are executable by the one or more processors to cause the one or more processors to select an alternate position for the vehicle and to provide the control signals to the one or more driving components of the vehicle to move the vehicle to the alternate position to place the object outside of the adjusted buffer zone.

10. The vehicle adjustment system of claim 9, wherein the instructions are executable by the one or more processors to cause the one or more processors to select the alternate position for the vehicle based on respective characteristics of other vehicles in proximity to the alternate position.

11. The vehicle adjustment system of claim 9, wherein the alternate position is in a parking lot, and the instructions are executable by the one or more processors to cause the one or more processors to:
   analyze the data to determine that the vehicle is at the alternate position in the parking lot;
   access a fee schedule of the parking lot;
   determine an owner of the parking lot; and
   transfer an appropriate amount of money from an account of a designated individual associated with the vehicle to the owner of the parking lot based on the fee schedule.

12. The vehicle adjustment system of claim 9, wherein the instructions are executable by the one or more processors to cause the one or more processors to provide a notification to a device of a person associated with the vehicle in response to the vehicle being repositioned to the alternate position.

13. The vehicle adjustment system of claim 9, wherein the instructions are executable by the one or more processors to cause the one or more processors to:
   receive an input indicative of a preference of a person associated with the vehicle; and
   determine the alternate position based on the data and the preference.

14. The vehicle adjustment system of claim 1, wherein the instructions are executable by the one or more processors to cause the one or more processors to adjust the buffer zone surrounding the vehicle based on the one or more characteristics of the object and weather conditions to establish the adjusted buffer zone.

15. A method of operating a vehicle adjustment system, comprising:
   receiving, at one or more processors, data from one or more sensors coupled to a vehicle;
   analyzing, using the one or more processors, the data to identify one or more characteristics of an object in a vicinity of the vehicle;
   adjusting, using the one or more processors, a buffer zone surrounding the vehicle based on the one or more characteristics of the object to establish an adjusted buffer zone; and providing, using the one or more processors, control signals to one or more driving components of the vehicle to reposition the vehicle to place the object outside of the adjusted buffer zone.

16. The method of claim 15, comprising:

analyzing, using the one or more processors, additional data to identify one or more respective characteristics of an additional object in the vicinity of the vehicle;

adjusting, using the one or more processors, the buffer zone based on the one or more respective characteristics of the additional object to establish the adjusted buffer zone; and providing, using the one or more processors, additional control signals to the one or more driving components of the vehicle to move the vehicle to place the additional object outside of the adjusted buffer zone.

17. The method of claim 15, comprising:

identifying, using the one or more processors, weather conditions in the vicinity of the vehicle; and adjusting, using the one or more processors, the buffer zone surrounding the vehicle based on the one or more characteristics of the object and the weather conditions to establish the adjusted buffer zone.

18. The method of claim 17, comprising identifying the weather conditions based on the data from the one or more sensors.

19. A vehicle adjustment system, comprising:

one or more processors;

memory storing instructions executable by the one or more processors to cause the one or more processors to:

analyze data from one or more sensors coupled to a vehicle to identify one or more characteristics of an object in a vicinity of the vehicle;

adjust a buffer zone surrounding the vehicle based on the one or more characteristics of the object to establish an adjusted buffer zone; and in response to determining that the object is within the adjusted buffer zone, provide control signals to one or more driving components of the vehicle to move the vehicle into an alternate position to place the object outside of the adjusted buffer zone.

20. The vehicle adjustment system of claim 19, wherein the instructions are executable by the one or more processors to cause the one or more processors to adjust the buffer zone surrounding the vehicle based on the one or more characteristics of the object and weather conditions to establish the adjusted buffer zone.

\* \* \* \* \*